(12) United States Patent
Hoffman et al.

(10) Patent No.: US 6,780,540 B2
(45) Date of Patent: Aug. 24, 2004

(54) ELEMENT SLEEVE FOR A BATTERY

(75) Inventors: Roderick L Hoffman, Daleville, IN (US); Rex W Holliday, Fishers, IN (US); Jason E Connell, Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 218 days.

(21) Appl. No.: 09/924,862

(22) Filed: Aug. 8, 2001

(65) Prior Publication Data

US 2003/0031920 A1 Feb. 13, 2003

(51) Int. Cl.[7] .......................... H01M 2/06; H01M 2/24; H01M 2/28
(52) U.S. Cl. ..................... 429/208; 429/179; 429/186
(58) Field of Search ........................ 429/66, 72, 161, 429/186, 93–100, 163, 179, 208

(56) References Cited

U.S. PATENT DOCUMENTS

| | | | | |
|---|---|---|---|---|
| 4,336,314 A | * | 6/1982 | Yonezu et al. ................ | 429/66 |
| 4,603,093 A | * | 7/1986 | Edwards et al. .............. | 429/54 |
| 5,227,260 A | * | 7/1993 | Rose et al. ................... | 429/54 |
| 5,336,275 A | | 8/1994 | Zguris et al. .............. | 29/623.5 |
| 5,389,465 A | * | 2/1995 | Hooke ......................... | 429/172 |
| 5,468,572 A | | 11/1995 | Zguris et al. ................ | 429/247 |
| 5,691,087 A | | 11/1997 | Rao et al. .................... | 429/245 |
| 5,874,186 A | | 2/1999 | Rao et al. .................... | 429/242 |
| 6,071,641 A | | 6/2000 | Zguris ......................... | 429/144 |
| 6,143,441 A | | 11/2000 | Zguris et al. ................ | 429/144 |
| 6,152,785 A | | 11/2000 | Haller et al. | |
| 6,153,329 A | | 11/2000 | Raschilla et al. | |
| 6,162,559 A | | 12/2000 | Vutetakis et al. ........... | 429/100 |
| 6,180,286 B1 | | 1/2001 | Rao et al. .................... | 429/245 |
| 6,376,126 B1 | * | 4/2002 | Faust et al. ................. | 429/176 |
| 6,738,552 B2 | | 5/2004 | Hirsch | |

* cited by examiner

Primary Examiner—Patrick Ryan
Assistant Examiner—Gregg Cantelmo
(74) Attorney, Agent, or Firm—Jimmy L. Funke

(57) ABSTRACT

An element body for a compressible stack of battery elements is provided. The element body defines a cavity for receiving the compressible stack of battery elements. The cavity has a height that is smaller than an uncompressed height of the compressible stack of battery elements. A cover compresses the compressible stack of battery elements to about the height of the cavity. The stack has a plurality of positive plates each having a positive lug, a plurality of non-conductive separators, and a plurality of negative plates each having a negative lug is provided. The positive plates, separators, and negative plates are configured into the compressible stack.

24 Claims, 9 Drawing Sheets

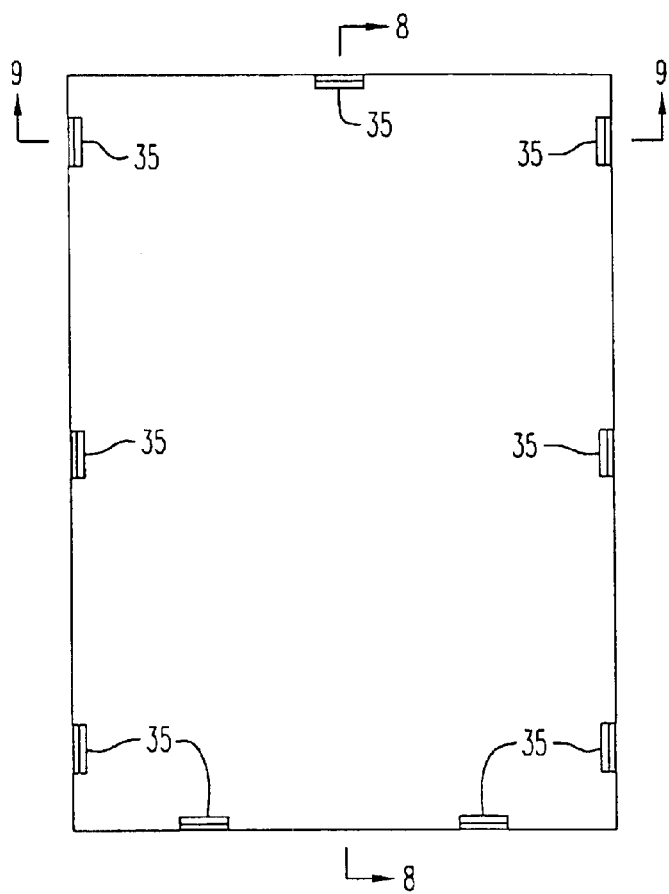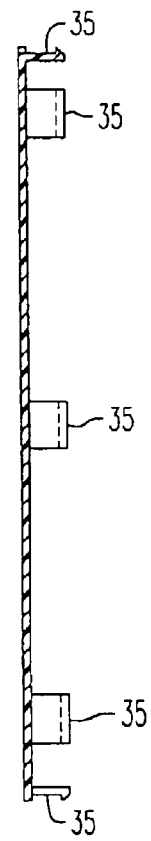
FIG. 7　　　　FIG. 8
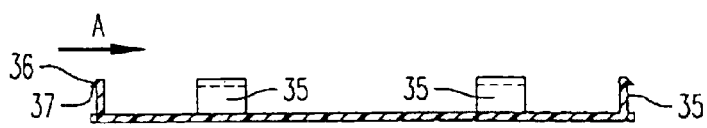
FIG. 9

ELEMENT SLEEVE FOR A BATTERY

TECHNICAL FIELD

This application relates generally to the field of batteries. More specifically, this application relates to element sleeves for pro-assembly of battery plates into cells having a desired compression state.

BACKGROUND

Lead-acid batteries use electrochemical materials, namely materials that produce electrical energy when exposed to certain electrolytes, to generate electrical current. In lead-acid batteries, lead is formed into plates or strips that are soldered together to form positive and negative electrodes. The positive and negative electrodes are interleaved to make up a complete battery cell. Separators are placed between the electrodes, and the complete cell is placed in a container along with other cells connected, in series or parallel, to provide a battery having the desired current and voltage capabilities. The electrolyte is placed in the container with the cells.

Lead-acid batteries use reactive sponge lead for the negative electrode, lead dioxide for the positive electrode, and dilute sulfuric acid for the electrolyte. During discharge of a lead-acid battery, the electro-chemical material is converted into lead sulfate by the acid, producing an electric charge. The amount of lead sulfate formed on the plates and the amount of acid lost from the electrolyte are in exact proportion to the rate of discharge. The reverse action takes place when the battery is recharged. Lead-acid batteries are typically classified by the manner in which the electrolyte is stored with in the battery. For example, lead-acid batteries include: (1) flooded lead-acid batteries; (2) gel lead-acid batteries; and (3) absorbed glass mat (hereinafter AGM) lead-acid batteries.

Flooded lead-acid batteries provide electrolyte to the plates in a liquid form. Gel lead-acid batteries provide electrolyte to the plates in a gelatinous state. AGM batteries provide electrolyte to the plates saturated in absorbent glass mats. AGM batteries are normally sealed, but they often times includes a valve that allows the escape of gas if the internal pressure exceeds a predetermined value. In this configuration, AGM batteries are also known as valve regulated lead acid or VRLA batteries.

The plates within an AGM battery are typically arranged so that they alternate in charge to form the battery cell. The absorbent glass mats separate the plates from adjacent plates to electrically insulate each plate from adjacent plates. The absorbent glass mats also provide multiple gas channels between the plates through which oxygen can migrate from the positive electrode when generated there to the negative electrode where it can be recombined with hydrogen, according to the oxygen cycle.

The battery cell, namely the plates and the separators, are maintained under compression to provide constant contact between the plates and the separators, respectively. Thus, AGM batteries require a state of constant compression of the plates and separators in each cell in order to function properly. The required compression is conventionally achieved by assembling the cell components into a stack having a given thickness, physically compressing the cell stack, and inserting the compressed cell stack in a battery case which is sized, relative to the size of the stack, to maintain the components of the cell stack under compression. Thus, the battery case is a stressed structural member of traditional AGM batteries and provides the required rigidity to the cells to maintain the necessary compression. However, this conventional method of using the battery case as a stressed member has numerous disadvantages.

Accordingly, the present invention provides an element sleeve, which not only provides the required structural and rigidity to the battery cell, but also aids in the assembly of the battery cell and the battery.

SUMMARY

It is an object to provide an element sleeve for a compressible stack of battery elements. The element sleeve has a body defining a cavity for receiving the compressible stack of battery elements. The cavity has a height that is smaller than an uncompressed height of the compressible stack of battery elements by about 5% to 50%. A means compresses the compressible stack of battery elements to about the height of the cavity.

It is yet another object to provide a battery cell having a plurality of positive plates each having a positive lug, a plurality of separators, and a plurality of negative plates each having a negative lug. The positive plates, separators, and negative plates are configured into a compressible stack. A casing receives the compressible stack. The casing has an interior height smaller by about 5% to 50% than an uncompressed height of the compressible stack. A cover mated with the casing compresses the compressible stack to about the interior height of the casing.

It is another object to provide an absorbed glass mat lead-acid battery. The battery has one or more battery cells connected to one another in series and/or parallel to provide a predetermined current capability and a predetermined voltage capability. The battery cells each have a plurality of positive plates, a plurality of absorbed glass mat separators and a plurality of negative plates configured into a compressible stack. The compressible stack is compressed in a casing by a cover to about an interior height of the casing. The interior height of the casing is smaller than an uncompressed height of the stack by about 20%.

The above-described and other features and advantages of the present invention will be appreciated and understood by those skilled in the art from the following detailed description, drawings, and appended claims.

BRIEF DESCRIPTION OF THE DRAWINGS

FIG. 7 is a bottom view of the cover of FIG. 6;

FIG. 8 is a sectional view of the cover of FIG. 7, taken along lines 8—8;

FIG. 9 is a sectional view of the cover of FIG. 7, taken along lines 9—9;

DESCRIPTION OF THE PREFERRED EMBODIMENT

Figure 1:
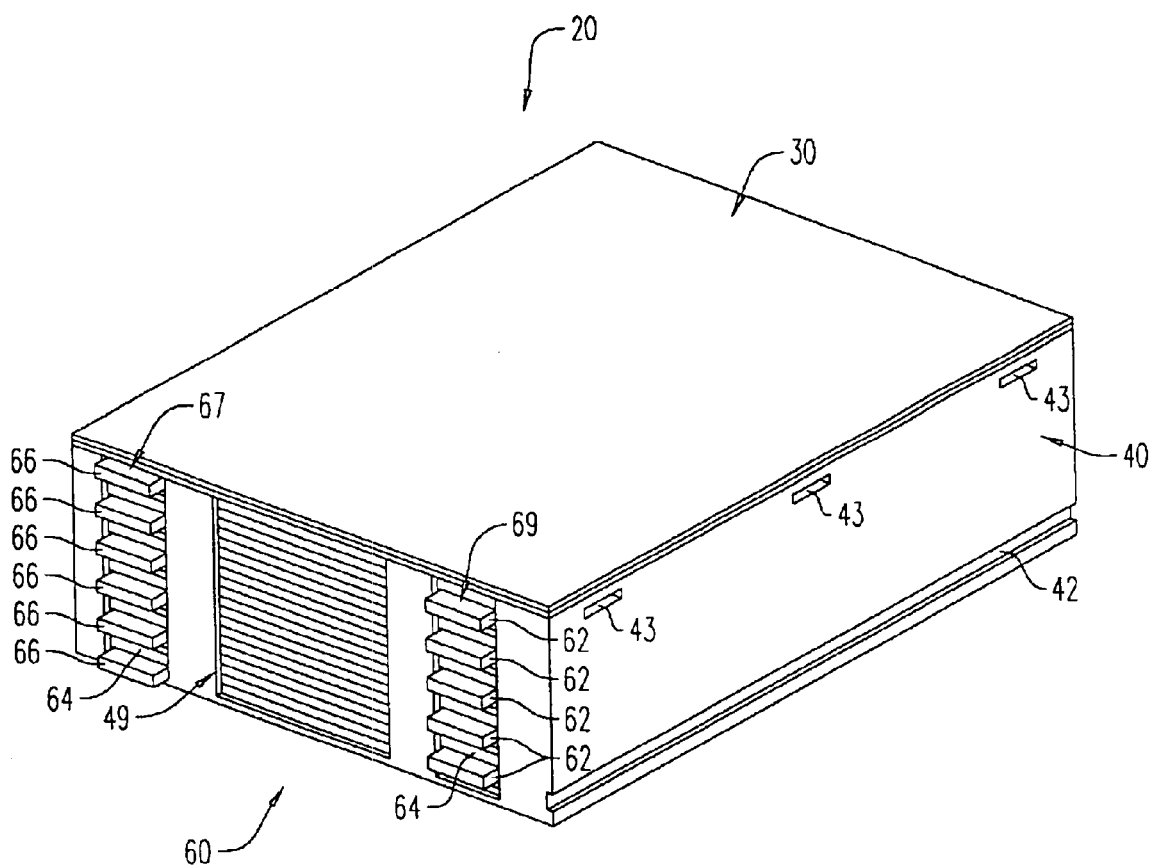
FIG. 1 is a perspective view of an exemplary embodiment of an element sleeve.

Referring to the Figures and particularly to FIG. 1, a casing or element sleeve designated by reference numeral 20 is shown. Element sleeve 20 includes an element sleeve cover 30 and an element sleeve body 40 defining a cavity 45 therein. Element sleeve 20 is adapted to receive a battery cell 60 in cavity 45. Thus, element sleeve 20 is non conductive and capable of withstanding the battery environment. In an exemplary embodiment, element sleeve 20 is a made of a polymer, such as, but not limited, to ABS plastic.

Figure 2:
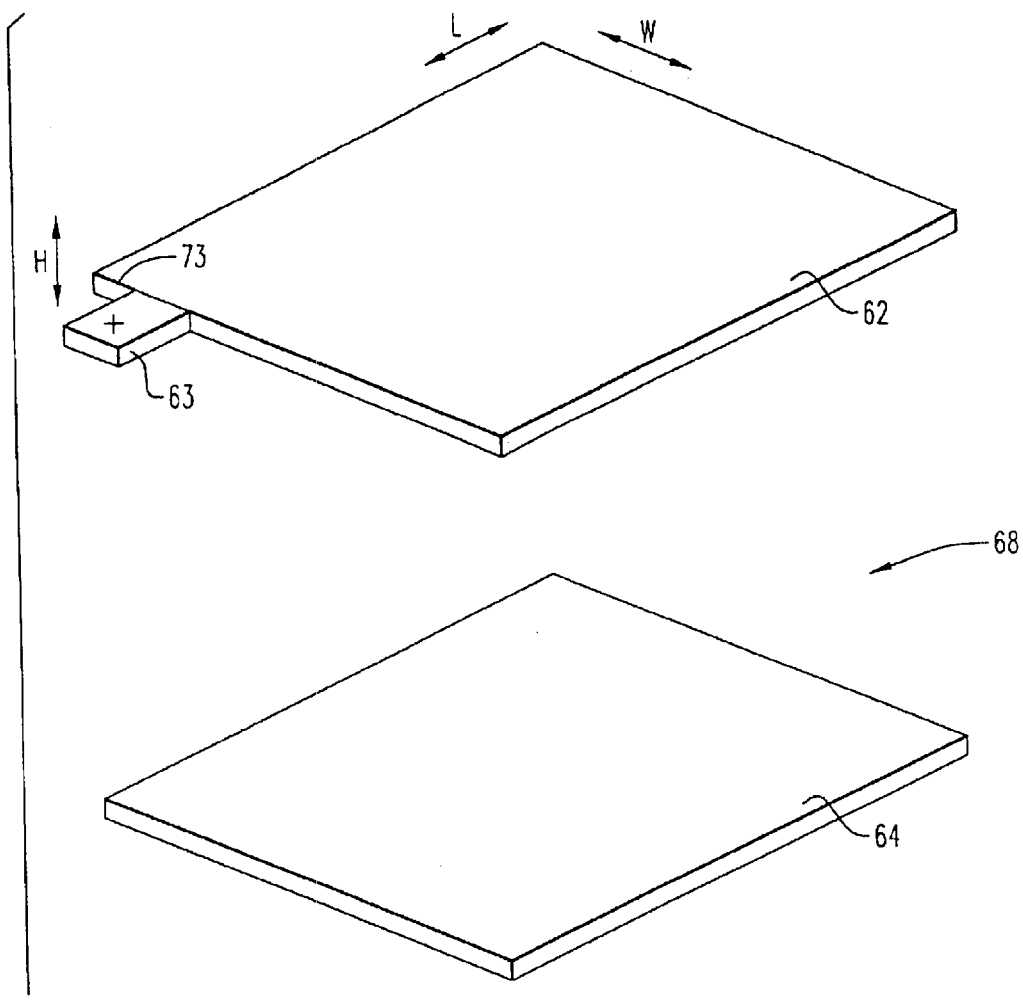
FIG. 2 is an exploded perspective view of a battery cell.

Battery cell 60, shown as an exploded view in FIG. 2, includes a plurality of positive battery plates 62, a plurality of AGM separators 64, and a plurality of negative battery plates 66. Cell 60 is preferably configured in a stack 68. Stack 68 is a compressible stack that alternates between positive plates 62 and negative plates 66 with a separator 64 between the opposing polarity plates. Stack 68 is shown as having one positive plate 62, one separator 64 and one negative plate 66, however any number of plates and separators is considered within the scope of the present invention.

Figure 3:
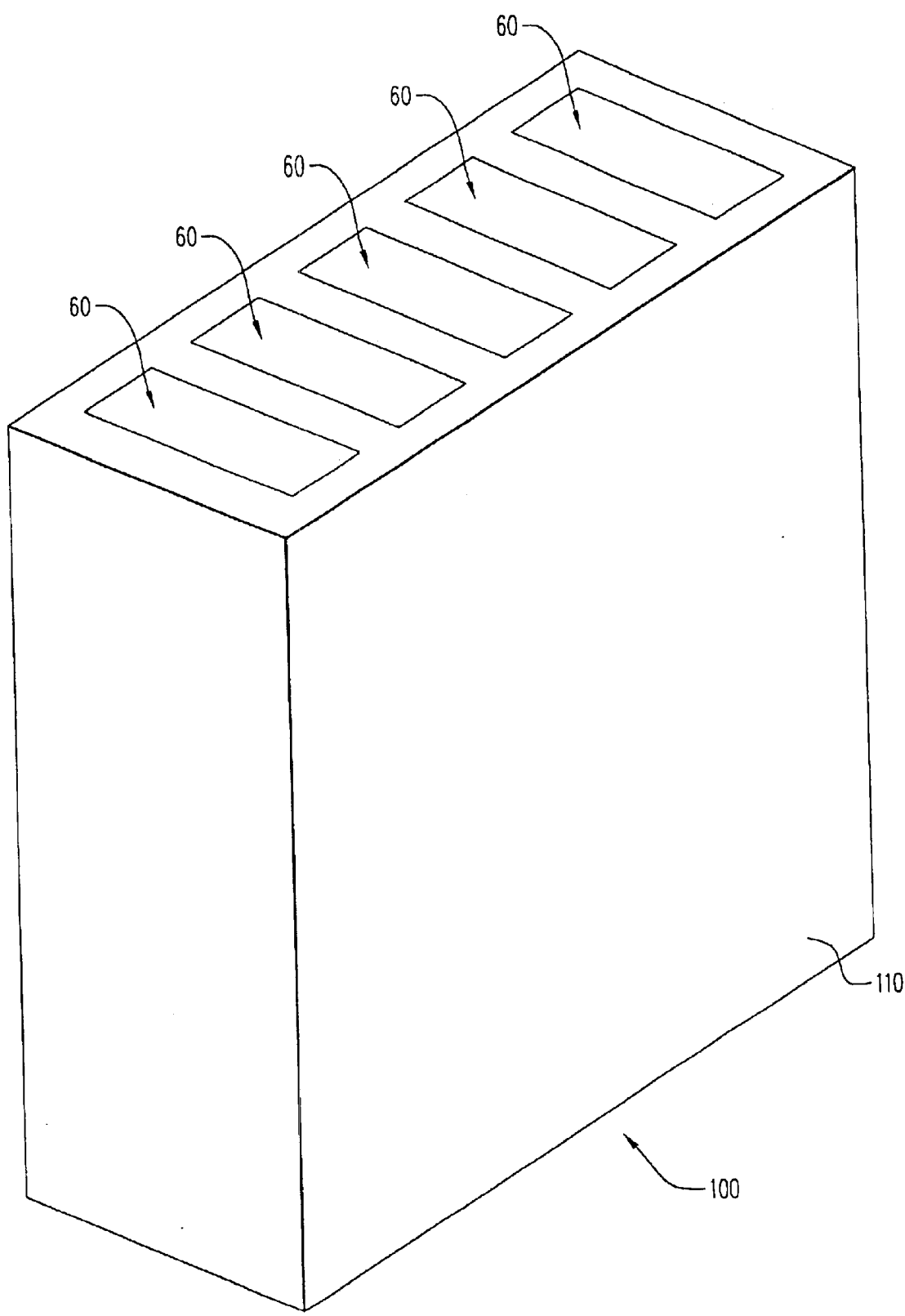
FIG. 3 is a perspective view of a battery formed with the battery cell of FIG. 2.

One or more battery cells 60 are connected, in series or parallel, to provide a battery 100, shown in FIG. 3, having the desired current and voltage capabilities. Cells 60 are placed in a battery case 110 along with the desired electrolyte. In an exemplary embodiment, cell 60 is configured to produce about 2.1 volts, and battery 100 is provided with six cells 60, providing about 12 volts. It should be recognized that cells 60 and batteries 100 configured to have alternate capabilities are within the scope of the present invention. For example, it is within the scope of the present invention to include cell 60 that produces more or less than 2.1 volts.

Element sleeve 20 allows for pre-assembly of battery cell 60 prior to placing the cell into battery case 110. Recess 45 of element sleeve 20 is adapted to receive stack 68 and aids in the alignment of plates 62 and 66 and separators 64 to provide for error proof placement within the element sleeve. Stack 68 is maintained under compression to provide contact between positive battery plate 62 and separator 64, and negative battery plate 66 and the separator. More specifically, element sleeve 20 is adapted to provide the necessary compression to stack 68. Thus, element sleeve 20 is dimensioned and sized, relative to the size of stack 68, to maintain the stack under a predetermined amount of compression along a single axis, yet allows for the growth of plates 62 and 66 in other axes for proper battery function as described below. Accordingly, element sleeve 20 provides stability to cell 60, which allows for a reduction in the thickness of battery case 110 as a result of the structural stability being provided to the cell by the element sleeve. Moreover, element sleeve 20 provides for a uniform compression to stack 68 by compartmentalizing the compression of each cell 60.

Also shown in FIG. 2, positive battery plates 62 have a positive lug 63 extending there from. Lug 63 is offset from the edge of positive battery plate 62 by a predetermined offset distance 73. Similarly, negative battery plates 66 have a negative lug 65 offset from its edge by a predetermined offset distance 75. Offset distance 73 is different from offset distance 75 for reasons that are described in detail below. Stack 68 is formed such that positive lugs 63 are aligned on one side of the stack, and such that negative lugs 65 are aligned on a second, opposite side of the stack.

Figure 4:
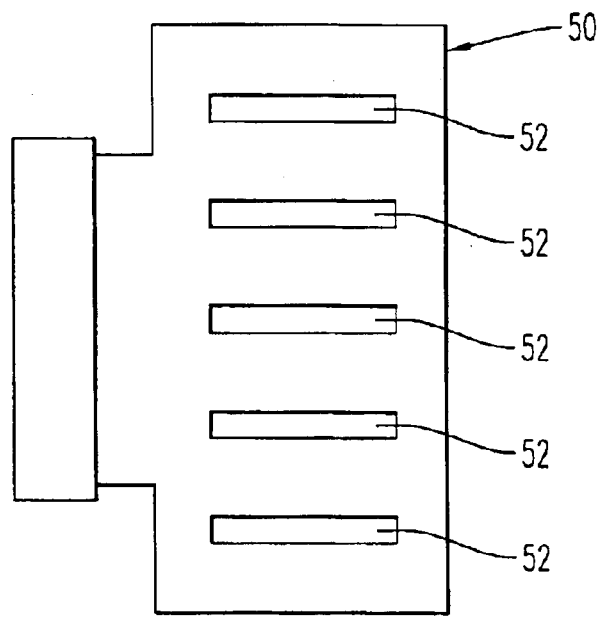
FIG. 4 is a front view of a connector for the lugs of the battery cell in the element sleeve of FIG. 1.
Figure 5:
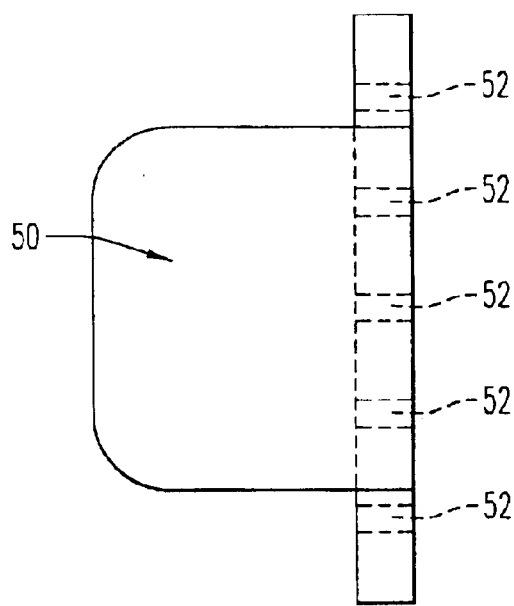
FIG. 5 is an end view of the connector of FIG. 4.
Figure 6:
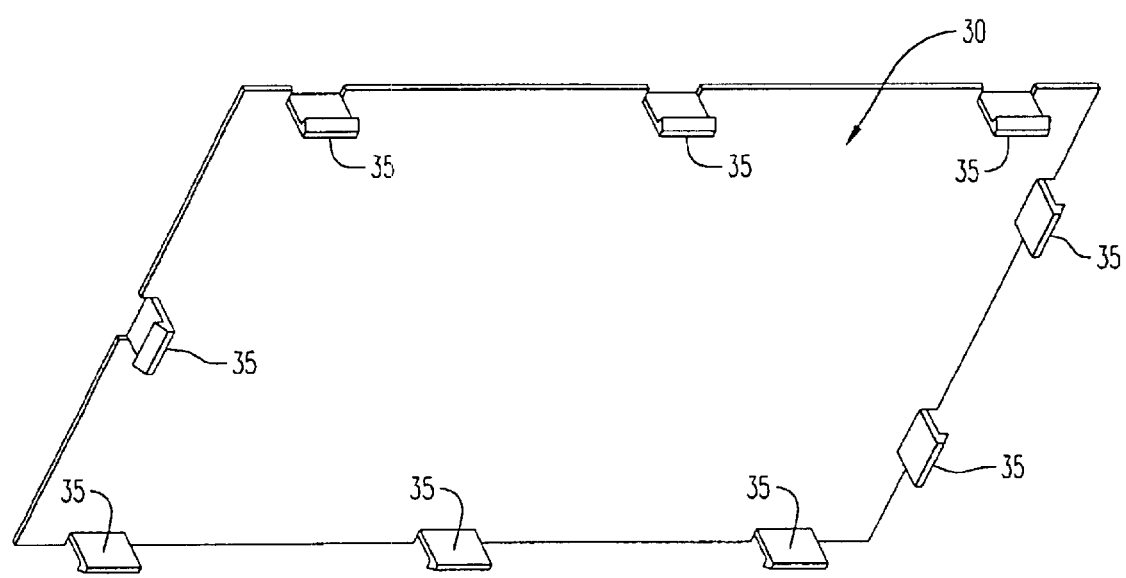
FIG. 6 is a bottom perspective view of another exemplary embodiment of an element sleeve cover.
Figure 10:
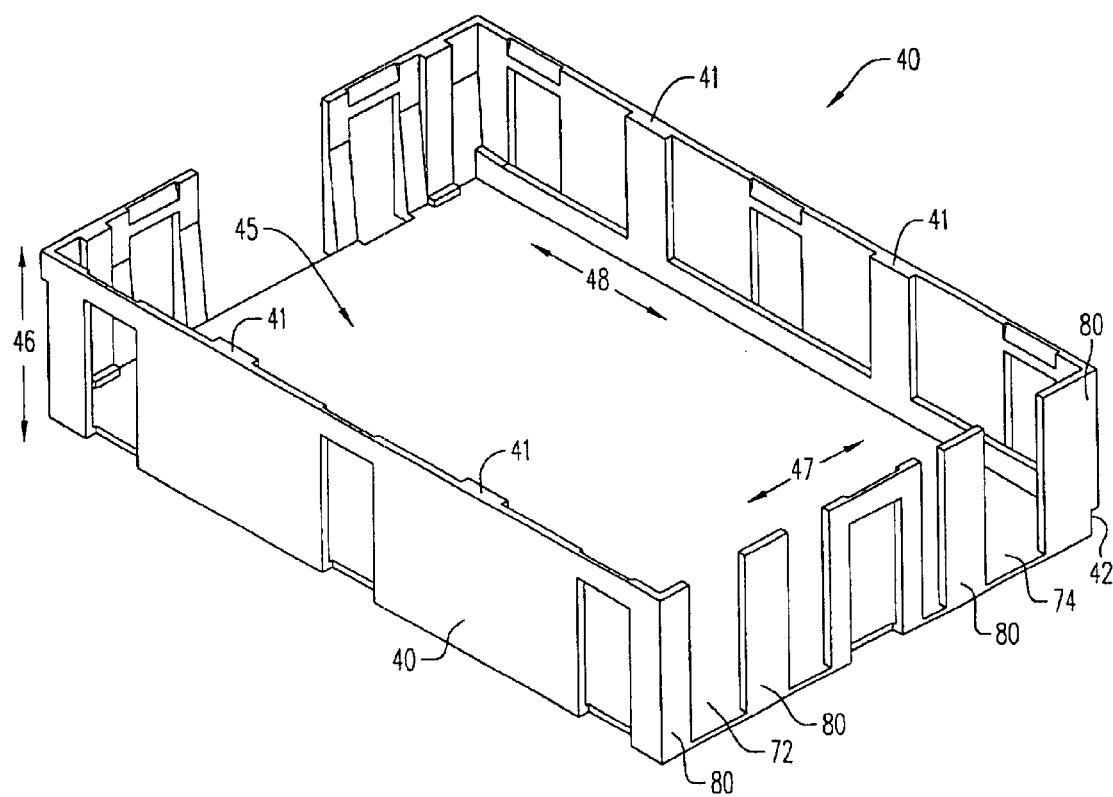
FIG. 10 is a top perspective view of another exemplary embodiment of an element sleeve body.
Figure 13:
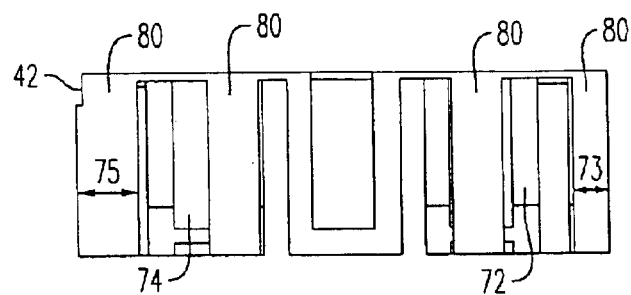
FIG. 13 is an end view of the body of FIG. 10.
Figure 12:
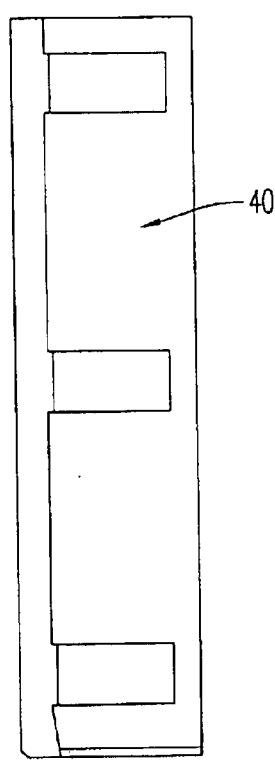
FIG. 12 is a first side view of the body of FIG. 10, the opposite side being identical thereto.
Figure 11:
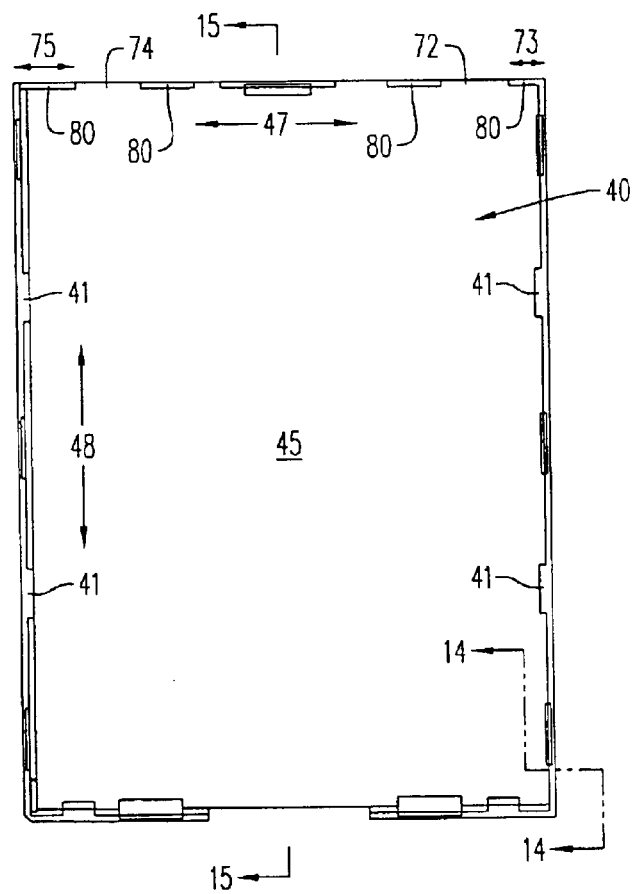
FIG. 11 is a top view of the body of FIG. 10.

A connector 50, shown in FIGS. 4 and 5, includes a plurality of lug slots 52 formed therein. Lug slots 52 are adapted to receive either positive lugs 63 or negative lugs 65 of stack 68. Thus, connector 50 connects lugs of like charge to one another to provide battery cell 60 with a positive electrode 67 and a negative electrode 69.

Figures 14, 15:
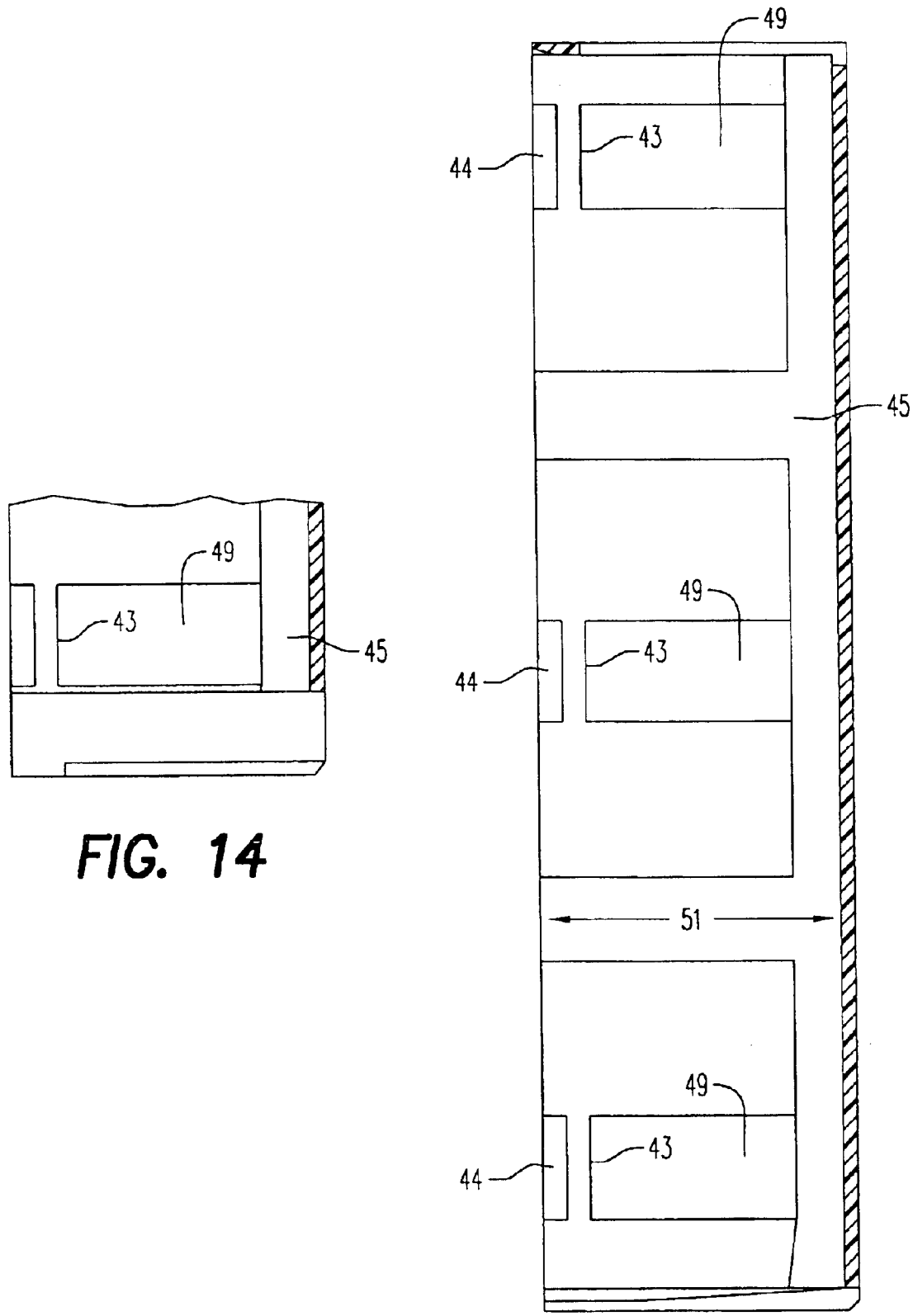
FIG. 14 is a sectional view of the body of FIG. 11, taken along lines 14—14.
FIG. 15 is a sectional view of the body of FIG. 11, taken along lines 15—15.

Embodiments of cover 30 are shown in FIGS. 1 and 6 through 9. Cover 30 is adapted to mechanically connected, adhesively bonded, thermally bonded, and the like, to body 40 to cover cavity 45. In an exemplary embodiment, cover 30 is mechanically connected to body 40 via a plurality of snap lock tabs 35. Tab 35 includes a chamfered top edge 36 and a lip 37 (FIGS. 8 and 9). Tab 35 is adapted to be resiliently biased inward cover 30 in the direction of arrow A when chamfered top edge 36 mates with body 40. Thus, tab 35 biases inward cavity 45 of body 40. Body 40 includes a recess or slot 43 (FIGS. 1, 14 and 15) in cavity 45. Once cover 30 mates with body 40, tab 35 resiliently biases outward the cover in a direction opposite arrow A such that lip 37 is received in slot 43, securing the cover to the body. In an alternate embodiment (FIGS. 14 and 15), body 40 includes a chamfered edge 44 corresponding to chamfered edge 36. Edge 44 and edge 36 cooperate to guide and bias lip 37 of tab 35 into slot 43.

Embodiment of element sleeve body 40 are provided in FIGS. 1 and 10 through 15. As discussed above, element sleeve 20 is dimensioned and sized, relative to the size of stack 68, to maintain the stack under a predetermined amount of compression along a single axis, yet allows for the growth of plates 62 and 66 in other axes for proper battery function. Stack 68 is received in cavity 45 of element sleeve 20. Cavity 45 has an interior height 46, width 47 and length 48. The free or uncompressed height of stack 68 is larger than height 46. Additionally, the free width and length of stack 68 are smaller than width 47 and length 48 of cavity 45.

In the embodiment of body 40 in FIGS. 10 through 15, slot 43 provides an aperture 49 in body 40. In the embodiment of body 40 in FIG. 1, aperture 49 is provided separate from slot 43. Regardless of its location on body 40, aperture 49 provides access to cavity 45.

Connecting cover 30 to body 40, as described below, reduces or compresses the free height of stack 68 such that the height of the stack is approximately equal to height 46. Thus, element sleeve 20 is adapted to compress stack 68 along the same axis as height 46 by the action of connecting cover 30 to body 40. During use, plates 62 and 66 typically grow or are enlarged due to the electrochemical reactions taking place. Since element sleeve 20 does not compress stack 68 along width 47 or length 48, plates 62 and 66 are permitted to grow along their length and width. Thus, longer and higher performance of battery 100 is achieved by allowing the electro-chemical reactions in plates 62 and 66 to grow the plates along their length and width.

The amount of compression provided to stack 68 effects the saturation and recombination abilities of separators 64. Accordingly, the amount of compression stack 68 requires is dependent on the end-use of battery 100 in which cell 60 is used. In a first exemplary embodiment, the difference in the free height of stack 68 and height 46 is in a range from about 5% to 50%. In another exemplary embodiment, difference in the free height of stack 68 and height 46 of body 40 is about 20%.

Body 40 is adapted to prevent expansion of plates 62 and 66 greater than width 47 and length 48 of cavity 45. In an exemplary embodiment, body 40 includes a plurality of reinforcing ribs 41. Ribs 41 add structural rigidity to body 40 to prevent bowing of the body, and, thus prevent expansion of plate 62 and 66 greater than width 47 and length 48 of cavity 45.

Body 40 also includes a positive lug alignment slot 72 and a negative lug alignment slot 74. Positive lug alignment slot 72 is offset from the side of body 40 by a distance corresponding to offset distance 73 described above. Similarly, negative lug alignment slot 74 is offset from the opposite side of body 40 by a distance corresponding to offset distance 75 described above. Thus, positive plates 62 are placed in cavity 45 such that positive lugs 63 extend through positive lug alignment slot 72, and negative plates 66 are placed in the cavity such that negative lugs 65 extend through negative lug alignment slot 74. As described above, offset distance 73 is different from offset distance 75. Moreover, the offset distance 75 for negative plates 66 and negative lug slot 74 are approximately equal, and the offset distance for positive plates 62 and positive lug slot 72 are approximately equal. Thus, alignment slots 72 and 74 ensure proper placement of the positive and negative plates 62 and 66 within body 40. More specifically, offset distance 73 prevents negative lug 65 from fitting in positive lug alignment slot 72 and offset distance 75 prevents positive lug 63 from fitting in negative lug alignment slot 74.

Additionally, in an exemplary embodiment slots 72 and 74 provides access to cavity 45 to allow for the addition of electrolyte to stack 68 after assembly of battery cell 60. Of course and as other uses may require, the addition of electrolyte to stack 68 after assembly of battery cell 60 via other openings to cavity 45 are within the scope of the present invention.

In an exemplary embodiment, slots 72 and 74 include one or more plate growth insulators 80. Insulators 80 are adapted to prevent positive lugs 63 from contacting negative lugs 65, even during the growing of positive plates 62 during use. Insulators 80 prevent the upper section of plate 62 (i.e., the end opposite lug 63) from contacting the bottom side of connector 50. More specifically, an insulator 80 is positioned on both sides of lug alignment slots 72 and 74. Thus, insulators 80 aid in holding lugs 63 and 65 within slots 72 and 74, respectively. Growth of plates 62 and 66 is restricted at slots 72 and 74 by insulators 80 such that lugs 63 and 65 are prevented from contacting one another.

Element sleeve 20 also aids in the alignment of cell 60 within battery case 110. In use in battery 100, each cell 60 is positioned in battery case 110 such that positive lugs 63 and negative lugs 65 are in predetermined positions. As described above, lug alignment slots 72 and 74 ensure that plates 62 and 66 are installed properly in body 40 such that the positions of lugs 63 and 65 are predictable. Predictable lug 63 and 65 positions allow body 40 to be provided with a guide for correct placement and alignment of cell 60 within battery case 110. In an exemplary embodiment, shown in FIG. 1, the guide is a slot 42 formed in one or more sides of body 40. In an alternate embodiment, shown in FIG. 10, the guide is a notch formed in one or more sides of body 40. The guide is adapted to mate with a corresponding guide formed on battery case 110. While described above as a notch and a slot, any guide that allows for correct placement and alignment of cell 60 within battery case 110 is considered within the scope of the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery cell, comprising:
   a plurality of positive plates each of said plurality of positive plates having a positive lug;
   a plurality of separators;
   a plurality of negative plates each of said negative plates having a negative lug, said plurality of positive plates, said plurality of separators, and said plurality of negative plates being configured into a compressible stack;
   a casing for receiving said compressible stack, said casing having an interior height smaller by about 5% to 50 than an uncompressed height of said compressible stack; and
   a cover mated with said casing compressing said compressible stack to about said interior height of said casing, wherein said casing further comprises:
   a first slot for receiving said plurality of positive lugs, said first slot being offset from a first side of said casing by a first predetermined distance and said positive lugs being offset a distance corresponding to said first predetermined distance; and
   a second slot for receiving said plurality of negative lugs, said second slot being offset from a second side of said casting by a second predetermined distance and said negative lugs being offset a distance corresponding to said second predetermined distance, said first predetermined distance being different than said second predetermined distance.

2. The battery cell of claim 1, wherein said plurality of separators are absorbed glass mat separators.

3. The battery cell of claim 1, wherein said interior height of said casing is smaller by about 20% than said uncompressed height of said compressible stack.

4. The battery cell of claim 1, wherein said cover includes a plurality of snap lock tabs mateable with a corresponding plurality of recesses in said casing for mating said cover and said casing.

5. The battery cell of claim 1, wherein said compressible stack has a width and a length that is smaller than an interior width and an interior length of said casing.

6. A battery cell, comprising:
   a battery cell structure, said battery cell structure defining a receiving area, a positive alignment opening, and a negative alignment opening;
   a compressible stack of battery cell elements in said receiving area, said compressible stack of battery cell elements comprising a plurality of positive plates each having a positive tab portion depending outwardly from a periphery, a plurality of negative plates each having a negative tab portion depending outwardly from a periphery, and a nonconductive separator disposed in between said plurality of positive plates and said plurality of negative plates; and
   a cover secured to said battery cell structure covering said receiving area, said positive alignment opening aligning said positive tab portion of each of said plurality of positive plates, and said negative alignment opening aligning said negative tab portion of each of said plurality of negative plates, wherein said positive lug alignment opening is offset from a first side of said battery cell structure by a first predetermined distance and said positive lugs being offset a distance corresponding to said first predetermined distance; and said negative lug alignment opening being offset from said first side of said body by a second predetermined distance and said negative lugs being offset a distance corresponding to said second predetermined distance, said first predetermined distance being different from said second predetermined distance.

7. The battery cell of claim 6, wherein said cover provides a compressive force to said compressible stack of battery cell elements.

8. The battery cell of claim 6, wherein said receiving area is larger in one or more battery plate growth directions than said compressible stack of battery cell elements.

9. The battery cell of claim 8, wherein said compressible stack of battery cell elements are inserted into said receiving area in an uncompressed state and said cover applies a compressive force to said compressible stack of battery cell elements when said cover is secured to said batter cell structure.

10. The battery cell of claim 6, wherein said receiving area is smaller one direction than said compressible stack of battery cell elements.

11. The battery cell of claim 6, further comprising one or more apertures on said battery cell structure for receiving a battery electrolyte.

12. The battery cell of claim 6, wherein said height of said receiving area is smaller than an uncompressed height of said compressible stack of battery elements by about 20%.

13. The battery cell of claim 6, wherein said cover comprises a plurality of snap lock tabs mateable with a corresponding plurality of recesses in said battery cell structure.

14. The battery cell of claim 6, wherein said compressible stack of battery elements has a width and a length that is smaller than a width and a length of said receiving area.

15. The battery cell of claim 6, wherein said battery cell structure further comprises a plurality of reinforcing ribs for preventing growth of said width and said length of said compressible stack of battery elements larger than said width and said length of said receiving area.

16. The battery cell of claim 6, wherein said positive lug alignment opening and said negative lug alignment opening each further comprise growth insulators for preventing said positive lugs from contacting said negative lugs during growth of the compressible stack of battery cell elements.

17. The battery cell of claim 6, wherein said battery cell structure further comprises a guide for placing and aligning the battery cell within a battery case such that said positive lugs are adjacent or proximate a positive battery electrode of said battery case, and such that said negative lugs are adjacent or proximate a negative battery electrode of said battery case.

18. The battery cell of claim 17, wherein said guide comprises a slot or notch.

19. The battery cell of claim 6, wherein said compressible stack of battery cell elements are inserted into said receiving area in an uncompressed state and said cover applies a compressive force to said compressible stack of battery cell elements when said cover is secured to said battery cell structure.

20. A battery having a plurality of battery cells, each battery cell comprising:
a plurality of positive plates each of said plurality of positive plates having a positive lug;
a plurality of separators;
a plurality of negative plates each of said negative plates having a negative lug, said plurality of positive plates, said plurality of separators, and said plurality of negative plates being configured into a compressible stack;
a casing for receiving said compressible stack, said casing having a pair of opposing side walls, a bottom portion disposed therebetween and a pair of opposing end walls, said end walls being disposed between said pair of side walls; and
a cover configure to engage said pair of side walls and said pair of end walls, one of said pair of end walls having a positive lug opening and a negative lug opening wherein said positive lugs and said negative lugs are positioned to be secured to a plurality of positive lugs and a plurality of negative lugs of another battery cell, said positive lug opening being offset a first distance from one of said pair of side walls and said negative lug opening being offset a second distance from the other one of said pair of side walls, said first distance not equal to said second distance.

21. The battery as in claim 20, wherein at least one of said side walls comprises a guide for guiding the placement of the battery cell within the battery.

22. The battery as in claim 21, wherein said guide is configured to mate with a corresponding feature of the battery.

23. The battery as in claim 21, wherein said guide is a notch in the housing.

24. The battery as in claim 21, wherein said guide is a slot in the housing.

* * * * *